Aug. 29, 1967  H. L. BURNSTEEL ET AL  3,339,162
ELECTRICAL COIL AND METHOD OF MAKING THE SAME
Filed May 25, 1965  2 Sheets-Sheet 2
FIG. 2
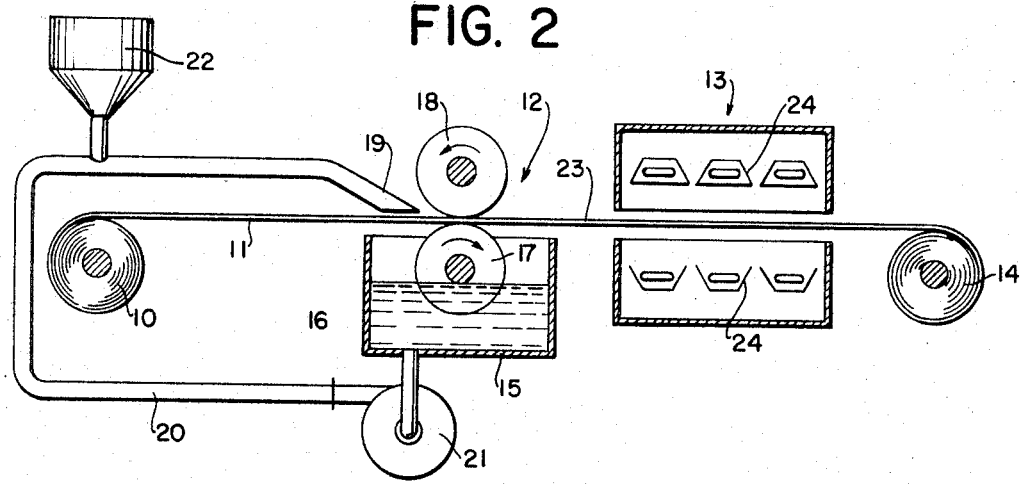
FIG. 3
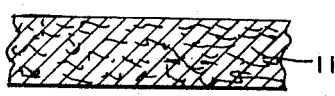
FIG. 4
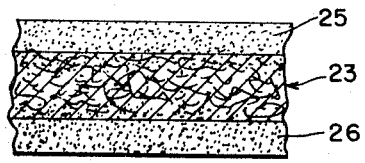
FIG. 6
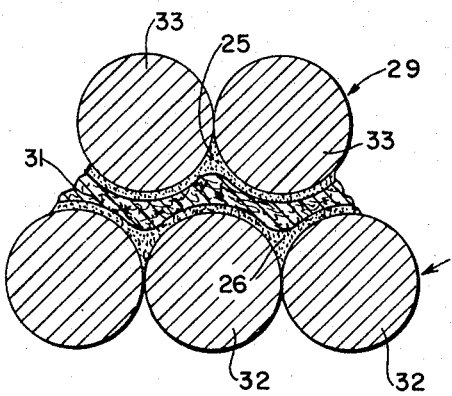
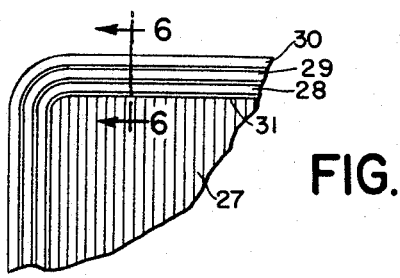
FIG. 5
INVENTORS
HARVEY LEE BURNSTEEL
WILLIAM R. PICKARD
FRANK A. LIEBERMANN, JR.
BY *Mandeville & Schweitzer*
ATTORNEYS

United States Patent Office 3,339,162
Patented Aug. 29, 1967

3,339,162
ELECTRICAL COIL AND METHOD OF MAKING THE SAME
Harvey Lee Burnsteel, Easton, Pa., William R. Pickard, Bloomsbury, N.J., and Frank A. Liebermann, Jr., Easton, Pa., assignors to Riegel Paper Corporation, New York, N.Y., a corporation of Delaware
Filed May 25, 1965, Ser. No. 458,665
5 Claims. (Cl. 336—205)

ABSTRACT OF THE DISCLOSURE

The invention is directed principally to the manufacture of interleaving paper for use in the winding of electrical coils such as transformers and solenoids. The interleaving paper is characterized particularly by its being impregnated with a composition of thermosetting resin and slate flour. The paper is used for interleaving while the thermosetting resin is in a partially cured state, enabling the heat-conductive slate flour to be extruded by cold flow into the interstices of the individual turns of wire. Improved heat dissipation and avoidance of hot spots is made possible.

---

In the manufacture of transformer and other electrical coils according to present techniques, it is a conventional practice to apply an insulating sheet of paper or the like between successive layers of turns of wire, as the winding of the coil progresses. Typically, a glassine or like paper might be used for this purpose. After completion of the various operations involved in the winding of the coil, the completed coil is subjected to an impregnation treatment, which may involve a treatment cycle of as much as 48 hours, in which the coil is exposed to vacuum conditions and then impregnated with a heat-conductive, electrically insulating composition, by which heat generated within the internal structure of the coil may be conducted to the outside and dissipated to maintain the coil at a reasonable operating temperature.

Extensive experience with current practices has demonstrated that it is practically impossible, under reasonable production conditions, to effect a reliably uniform penetraion of the wound coil structure by the impregnating composition. Accordingly, the completed coil may have internal voids and air spaces which, in operation, become internal "hot spots" because of the relative inefficiency of the heat transfer in those areas. As will be understood, the presence of such "hot spots" may cause the entire coil assembly to operate at a higher than desired temperature and, if the hot spot is of sufficient magnitude, premature failure of the coil is experienced.

In accordance with the present invention, novel and improved coil winding arrangements are provided which assure reliable, uniform and thorough distribution of the heat-conductive composition throughout the internal structure of the coil, such that voids, air pockets, and like defects which result in hot spots in the completed unit are reliably avoided under production conditions. In accordance with the invention, a novel interwinding web material is provided, to be wrapped between successive individual layers of turns of the coil, which incorporates the desired heat-conductive, electrically insulating composition in a uniform distributed manner. Thus, as the composition-carrying sheets are incorporated in the coil structure during the winding thereof, the finished coil, at the completion of winding, already includes the desired heat-conductive material and does not require the customary subsequent vacuum impregnation procedures, which not only involve significant time and expense but have been established to be less effective and reliable than desired.

In accordance with one of the more specific aspects of the invention, the improved interwrapping sheet carries the desired heat-conductive composition in a uniformly distributed manner, not only internally of the sheet but also on its opposed surfaces. The coated and impregnated composition includes as its significant components a slate flour and a partially cured thermosetting resin, with the slate flour serving as the primary heat-conductive agent and the thermosetting resin serving as a carrier and fixer for the slate flour. At the time of incorporation of the interwrapping sheet into the coil structure, the thermosetting resin has been activated to a partially but incompletely cured condition, in which it is substantially tack-free to the touch. Thus, the sheet is readily handleable under ordinary production conditions yet is at the same time sufficiently pliable to enable the sheet to be wrapped into the coil structure in the manner desired and also, importantly, to enable some flow of the resin and suspended slate flour to occur under the pressures involved in winding successive layers of turns, such that the heat-conductive composition effectively fills the voids and interstices between adjacent wires or turns of the coil.

Coil manufacture in accordance with the present invention makes use of a composition-carrying paper sheet which can be produced on an economical basis by solvent coating techniques. By proper formulation of the coating composition, a desired uniform distribution of the slate flour and resin components may be realized, with desired portions of the composition being incorporated as an impregnant within the web material, and other desired proportions of the composition being applied as surface coatings.

One of the significant advantages of the invention resides in the fact that very significant savings can be realized in the manufacture of electrical transformers and other electrical elements using coils. In part, production savings are realized by enabling complete elimination of the lengthy and costly vacuum impregnation cycles heretofore required in the manufacture of coils of corresponding capability. Additional advantages are realized in the actual coil winding stages, because of the fact that the slate-flour composition-containing interwrapping sheet has a much rougher, clinging surface than interwrapping papers heretofore customarily used. The rougher sheet has proved to be significantly advantageous in holding the endmost turns of the respective coils in place during the winding procedures and up to the final potting or encapsulation of the unit.

For a better understanding of the invention, reference should be made to the following detailed description and to the accompanying drawings, in which:

FIG. 2 is a schematic illustration of a process line used in the manufacture of an interwrapping sheet or web material according to the invention, for use in connection with the manufacture of electrical coils;

FIGS. 3 and 4 are highly magnified, fragmentary, cross-sectional views of an interwrapping paper web material before and after application of a composition according to the invention;

FIG. 5 is an enlarged, fragmentary, transverse, cross-sectional view of a transformer or other electrical coil manufactured in accordance with the invention; and FIG. 6 is a highly enlarged, fragmentary, cross-sectional view taken generally along line 6—6 of FIG. 5 and illustrating the internal construction of a coil manufactured in accordance with the invention.

Figure 1:
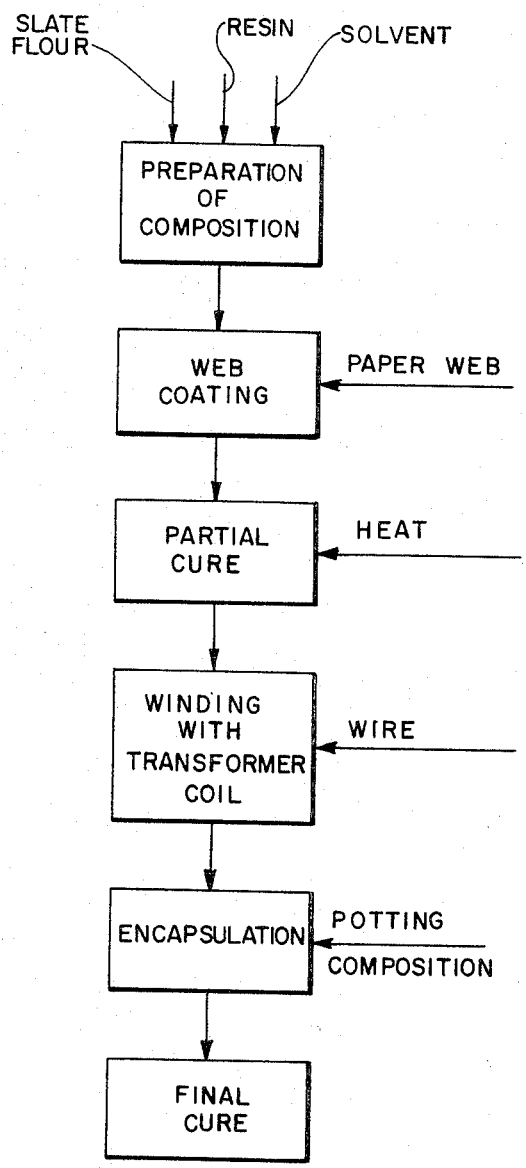
FIG. 1 is a simplified, diagrammatical flow diagram of a complete series of steps involved in the manufacture of a transformer coil or other electrical coil according to the invention.

With reference now to the drawing, an overall coil manufacturing procedure according to the invention, and as schematically illustrated in FIG. 1, involves as a first step, preparation of the coating and impregnating composition by proper proportioning and mixing of its primary components of slate, flour, thermosetting resin, and solvent, as will be described in more detail. The composition is then applied to a suitable base web material, in the form of a saturatable fibrous web, and the coated web is then subjected to sufficient heat to drive off the solvent from the composition and to advance the thermosetting resin to a stage of partial but incomplete curing in which the resin is substantially tack-free to the touch, while still being characterized by a reasonable degree of flexibility and pliability. The coated web is then ready for incorporation in the coil manufacturing procedure, and may advantageously at this stage be cut into sheets of predetermined size suitable for individual utilization in the coil winding procedures.

In the winding of transformer and similar coils according to the invention, successive layers of turns of the winding are formed, using equipment known for the purpose. After each layer of turns is completed, the layer is overwrapped with a sheet or web section incorporating the new composition, and the winding operation is resumed to form the next layer of turns more or less concentrically about the previous layers of turns and wrappings. This sequence of operations proceeds until the desired number of layers of turns has been achieved.

In some cases, it may be advantageous to wind a number of coils, simultaneously, in a side-by-side arrangement on a single winding core or mandrel. In such cases, after completion of the winding of a given layer of turns of all of the coils, a single, large overwrapping sheet may be applied. After all of the winding operations are complete, the individual coils may be separated by cutting the exposed portions of overwrapping sheets which extend between and connect adjacent wound coils.

After winding of the coils in accordance with the above-described procedures, the individual coils advantageously are encapsulated by a suitable potting composition, which advantageously is compatible with and may be substantially similar to the composition carried by the coated web material. This potting composition may be poured into the spaces or interstices between adjacent interwrapping sheets at the opposite ends of the coil, and may be poured or otherwise applied about the remainder of the coil body to provide for complete encapsulation. In many cases, the encapsulating composition is arranged to fill an entire space between the wound coil and an outer housing for the coil, as will be understood.

The completed, encapsulated coil is next subjected to a heat treatment for a time and at a temperature suitable to effect final curing, not only of the encapsulating composition, but also of the partially cured resin composition carried by the interwinding sheets. The final, cured product contains reliably and uniformly distributed heat-conductive composition throughout the coil without requiring time-consuming and expensive vacuum impregnating treatments heretofore considered necessary in accordance with prior art procedures.

In accordance with specific aspects of the invention, the composition utilized in the preparation of the interwinding web material comprises nearly equal parts of slate flour and resin solids, with sufficient solvent incorporated to make the composition handleable in web coating procedures. The slate flour is a very fine powdery material, which is available commercially. The process of the invention has been carried out to advantage using No. 1221 slate flour supplied by Whittaker, Clark & Daniels, Inc., of New York, New York. The designated material contains 99.8% particles capable of passing through a 325 mesh screen, and 99.6% particles capable of passing through a 400 mesh screen. In an optimum composition prepared in accordance with the teachings of the invention, slate flour solids were utilized in a ratio to resin solids of about 1:1.113 or about 47.3% slate flour solids to about 52.7% resin solids. Most advantageously, the thermosetting resin component of the composition is a polyester-based resin having desirable thermosetting properties. One particularly advantageous resin for this purpose is made available by The Glidden Company, Cleveland, Ohio, and, as of August 28, 1964 bore their designation 9RP–3184, Type 351602. This composition is characterized by the maker as an "unsaturated polyester-phthalic anhydride resin." Although the exact composition of this designated resin has not been made known by the manufacturer, a possible composition, based upon infra-red analysis, comprises about 14.6% maleic anhydride, about 44.6% phthalic anhydride, and about 41.0% propylene glycol. A second polyester-based, thermosetting resin suitable for the purposes of the invention is available from P. D. George Company, St. Louis, Mo., under the manufacturer's designation "Pedigree No. 443, Class F, clear insulating varnish." The P. D. George product is indicated to be an unsaturated polyester-isophthalic anhydride resin.

In the preparation of the composition, the slate flour resin components are introduced in approximately the optimum proportions previously indicated (1 part slate flour solids by weight to 1.113 parts resin solids by weight), and additional solvent is introduced in quantities sufficient to provide a composition having approximately 65% solids. In this respect, it is desirable to keep the solids content of the composition relatively high, consistent with being able to handle the composition properly at the coating tower, to minimize the natural tendency for the slate flour to settle out of the mixture. The solvent utilized typically may be toluene or methylethyl ketone, depending upon the solvent contained in the resin as supplied by the manufacturer. Preferably, the composition is prepared in the absence of external heat.

In the practice of the invention, the web material utilized to receive the slate flour-resin composition is an impregnatable or saturatable fibrous web such that, when the composition is applied, it not only forms a surface coating on the web but actually penetrates the internal structure thereof to provide for enhanced heat-conductive properties internally of the web. Advantageously, the web material may be a sheet known as "Westinghouse saturating kraft" which is a neutral, free sheet, ideally suited for the purpose intended. The weight of the sheet is a function of the desired finished caliper, which in turn is a function of the design of the coil, as will be understood. By way of example, however, for a coated sheet of 2 mils finished caliper, it is appropriate to utilize a 22 pound (per ream of 3,000 square feet) sheet as the base web to be coated. For a 3 mil finished caliper, a 33 pound sheet may be utilized, and for a 5 mil finished caliper, the basis weight of the web may be about 51 pounds.

The arrangement for applying the coating material may be substantially as shown in FIG. 2, in which the reference numeral 10 designates a supply roll of the base web material 11. The uncoated web 11 is directed through a coating station, generally designated by the numeral 12, then through a drying and curing station generally designated by the reference numeral 13, and then is wound, as at 14, or cut into sheets, as desired.

The coating equipment illustrated in FIG. 2 comprises a reservoir 15 which retains a supply 16 of the solvent-diluted coating composition, as described, advantageously at about 65% solids content. A lower coating roll 17 is positioned to dip into the contained supply of coating composition and is arranged to contact the lower surface of the web 11, as indicated. An upper roller 18 is journaled directly above the roller 17, forming a pressure nip therewith, and is arranged to contact the upper surface of the web 11.

As the uncoated web passes through the pressure nip formed by the coating rollers 17, 18, coating composition in appropriate amounts is carried onto the lower web surface by adherence to the surface of the roller 17, as it travels through the contained supply of coating composition in the reservoir 15. Coating composition is supplied to the upper surface of the web, directly in advance of the upper pressure roller 18, by means of a flooding nozzle 19, which is supplied with composition through a pipe 20 and pump 21, which draws from the reservoir supply 16. Advantageously, the flooding nozzle 19 supplies an excess quantity of the coating composition to the upper surface of the web. The composition is then properly metered onto the web surface by means of the roller 18, with the excess falling off the edges of the sheet and returning by gravity to the reservoir 15.

In some cases, the natural circulation of the composition, provided by the flow of material from the bottom of the reservoir 15 to the flooding nozzle 19, may be sufficient to keep the slate flour properly suspended and uniformly distributed throughout the composition. However, if necessary, suitable agitation facilities (not shown) may be provided in the reservoir to keep the slate flour properly distributed and in suspension.

The applied weight of coating composition is a function of the original basis weight of the uncoated web 11, and its saturating characteristics, and also of the viscosity of the composition 16. Using a so-called Westinghouse saturating kraft web material, and a composition as described and having approximately 65% solids content, approximately 11 pounds (dry) of composition was applied to a 22 pound web, an average of approximately 13 pounds was applied to a 33 pound web, and an average of about 18 pounds was applied to a 51 pound web.

In the installation shown, make-up composition advantageously is applied, as through a hopper 22, directly into the piping 20 leading to the flooding nozzle 19. Under appropriate circumstances, however, it could be added directly to the reservoir 15.

The coated web 23, emerging from the output side of the coating rollers 17, 18, is directed through the drying and heating chamber 13, which includes a plurality of heaters 24 and suitable solvent removal facilities (not shown). As it passes through the chamber 13, the web loses its solvent component, and continued heat causes the thermosetting resin component to advance partly through its curing stages. In accordance with the invention, however, the time and temperature relationships are such that the resin carried by the web is only incompletely cured, advantageously to a stage where it is substantially tack-free to the touch. At this stage, however, the web material should be pliable, and the composition should be flexible and capable of conforming to the configuration of the coil in which it is to be interwound.

In FIGS. 3 and 4, the web sections 11 and 23 are illustrated before and after coating. In particular, with respect to FIG. 4, it should be noted that the composition is carried by the finished web, not only as surface coatings 25, 26 but also as an internal impregnant within the sheet, so that the entire body of material comprising the coated sheet has desired, advantageous heat-conduction characteristics.

In FIG. 5, there is illustrated a partially formed, typical coil structure, which includes, for example, a laminated iron core 27 surrounded by successive layers 28–30 of turns of electrical wire. Between the core 27 and the first layer of turns 28, and between the successive layers 28, 29 and 30, there are provided individual interwound sheets 31 of the coating web material 23 of the invention.

Referring more particularly to FIG. 6, portions of two successive layers 28, 29 of turns are indicated, with the individual conductors 32–33 (typically provided with a thin coating of insulating varnish, not specifically illustrated) are wound in axial progression, with the adjacent turns of a given layer substantially abutting in side-by-side relation. After completion of a first layer of turns 28, the coated sheet 31 is applied over the outside of the wound conductors, held in place temporarily, and winding of the next successive layer of turns is commenced over the outside of the interwound coated sheet. Winding of the next successive layer of turns proceeds, with the wire under a predetermined winding tension in accordance with known procedures, and the pressure of the outer layer of turns acting radially inward upon the interwound sheet 31 causes some deformation of the sheet and its surface coatings 25, 26, more or less in the manner indicated in FIG. 6, such that the heat conductive composition is forced into the voids and interstices between the individual turns 32, 33, and urged into better surface contact with the wire conductors. In this respect, it will be understood that the coated web, at the time of winding of the coil, carries the slate flour-thermosetting resin composition in a partially cured, pliable condition, so that a certain amount of compliance of the sheet and coating is accommodated and some cold flow of the coating may take place to achieve good contact even in the relatively narrow crevices between conductors.

In accordance with conventional coil winding procedures, it is customary to provide for the interwinding sheet to project axially a short distance from the ends of the conductor windings. This tends to fix the endmost turns of the winding in position until such time as the coil is encapsulated or potted. In the procedure of the present invention, particularly advantageous characteristics are realized as regards holding the endmost turns temporarily in position, by reason of the inherent surface roughness of the interwound sheets provided with surface coatings of the new composition. This characteristic is particularly desirable in connection with procedures for winding a number of coils simultaneously, using single, axially elongated interwinding sheets between successive layers of coils. After winding of the coils, the individual coils are separated by cutting transversely through the interwound sheets, between coils, and it is particularly important to avoid slippage of the endmost turns of the coils at this stage.

After separation of the individual coils, they may be completed by encapsulation, by pouring or otherwise applying composition about the coil and into the spaces between projecting ends of the interwinding sheets. Advantageously, the encapsulating compound may correspond generally to the slate flour-resin compound applied to the interwinding sheet, but a styrene based solvent may be utilized to promote cross-linking. The completed, encapsulated coil may be cured to the final stages of the thermosetting resin by exposure to temperatures of about 275° F. for a period of about 3 hours.

One of the significant advantages realized in the practice of the invention is the reliable avoidance of air pockets and voids in a transformer or other electrical coil, so that internal hot spots are effectively avoided or minimized, thereby obviating one of the principal sources of electrical coil failure. In addition to the avoidance of localized hot spots, transformers and other coils constructed in accordance with the invention are able to operate as much as 10° C. cooler than conventional coils of equivalent capacity, by reason of the improved conduction of heat to the exterior of the coils.

The significant operating advantages mentioned above are accompanied by substantial economies in the manufacturing procedures themselves. In part, this is due to improved facility of winding, resulting from the high friction characteristics of the interwinding sheet. Of major significance, however, is the complete elimination of the time-consuming, expensive, and relatively unreliable vaccuum impregnating procedures now required to achieve transformers and other coils of corresponding capabilities.

It should be understood that the specific features of the invention herein described are intended to be represen-

We claim:

1. An electrical coil winding paper having uniformly distributed heat conducting and electrical insulating properties, comprising
    (a) a fibrous base web impregnated and coated with a heat conductive, electrically insulating composition,
    (b) said composition comprising slate flour and a thermosetting resin vehicle,
    (c) said composition being incompletely heat cured to a condition in which the impregnated and coated web is substantially tack free to the touch but readily pliable for ultimate interwinding in an electrical coil assembly.

2. An electrical coil winding paper having uniformly distributed heat conductive and electrical insulating properties, comprising
    (a) a fibrous web impregnated and coated with a pressure deformable composition,
    (b) said composition comprising slate flour and a thermosetting vehicle,
    (c) the deformable coating being of such a nature as to flow into the voids and interstices of an electrical coil when wound between successive layers of the coil.

3. The method of winding an electrical coil or the like, which comprises
    (a) winding successive layers of turns of the coil,
    (b) wrapping individual successive layers of turns with a paper web impregnated and coated with a composition of slate flour and partially cured thermosetting resin,
    (c) said individual successive layers being wound to a length shorter than the axial dimension of the paper webs over which the turns are wrapped, whereby axial end margins of the individual paper wrappings project beyond the layers of turns at each end of the coil, and
    (d) thereafter exposing the wound coil and interwrapped web material to heat at a temperature and for a time sufficient to fully cure the resin component.

4. The method of claim 3, further characterized by
    (a) applying a compatible slate flour thermosetting resin composition about the exterior of the wound coil and into the interstices between projecting end margins of the wound web sections, and
    (b) curing the resin component of the composition applied about the exterior of the coil along with curing of the resin component on and in the web sections.

5. An electrical coil, comprising
    (a) a plurality of successive layers of turns of conductive wire, and
    (b) a wrapping interposed between individual successive layers of turns,
    (c) said wrapping comprising a fibrous web material containing and carrying on its opposite surfaces distributed amounts of slate flour-thermosetting resin composition,
    (d) said slate flour-thermosetting resin composition comprising more than 40% slate flour and more than 50% resin, by solid weights,
    (e) the resin component of said composition having been cured under heat,
    (f) portions of said composition on and in said fibrous web having been displaced by the pressure of adjacent successive layers of turns and caused to flow into the voids and interstices between adjacent turns of wire.

References Cited

UNITED STATES PATENTS

| 14,101 | 1900 | Heys | 336—206 |
| 1,370,666 | 3/1921 | Novotny | 264—137 X |
| 1,880,930 | 10/1932 | Elbel. | |
| 2,459,018 | 1/1949 | De Monte. | |
| 2,890,396 | 6/1959 | Hutzler | 317—258 |
| 2,924,264 | 2/1960 | Imhof. | |

OTHER REFERENCES

Hemming, E.: Molded Electrical Insulation, Clausen and Co., N.Y., 1914, pp. 14, 15, 66 and 67.

LEWIS H. MYERS, *Primary Examiner.*

E. GOLDBERG, *Assistant Examiner.*